United States Patent

Scheffer

[15] 3,635,272

[45] *Jan. 18, 1972

[54] THREADED FASTENING DEVICE AND METHOD OF MAKING THE SAME

[72] Inventor: Harry Scheffer, Brackwede, Germany

[73] Assignee: Helmut Rieke, Thal u. Bad Pyrmont, Germany

[*] Notice: The portion of the term of this patent subsequent to July 14, 1987, has been disclaimed.

[22] Filed: Nov. 6, 1969

[21] Appl. No.: 874,579

Related U.S. Application Data

[63] Continuation-in-part of Ser. No. 764,264, Oct. 1, 1968, Pat. No. 3,520,342.

[52] U.S. Cl. ............................................................. 151/7
[51] Int. Cl. ....................................................... F16b 39/34
[58] Field of Search ...................... 151/7; 85/1 JP; 285/220; 277/166; 10/86 A; 10/86

[56] References Cited

UNITED STATES PATENTS

| | | | |
|---|---|---|---|
| 2,726,101 | 12/1955 | Peterson | 151/7 X |
| 3,040,796 | 6/1962 | Gouverneur | 151/7 |
| 3,203,459 | 8/1965 | Coldren | 151/7 |
| 3,265,107 | 8/1966 | Glicksman | 151/7 |
| 3,316,338 | 4/1967 | Rieke | 151/7 X |
| 3,399,589 | 9/1968 | Breed | 151/7 X |
| 3,520,342 | 7/1970 | Scheffer | 151/7 |

*Primary Examiner*—Ramon S. Britts
*Attorney*—Kelman and Berman

[57] ABSTRACT

A cylindrically enlarged end of an otherwise hexagonal steel nut has a shallow cylindrical depression in its radial seating face. Shallower recesses extend radially outward from the depression which partly receives a nylon ring in the relaxed condition of the latter. The portion of the ring which projects from the depression is frustoconical and its volume is not greater than the joint capacity of the shallower recesses. When used on a bolt for fastening a work piece receiving the bolt in an oversized opening, the ring material quickly seals any gaps between the bolt, the workpiece and the nut. Any excess ring material flows into the recesses and none is extruded into the narrowing gap between the seating face of the nut and the workpiece. The important conical shape of the ring is maintained during manufacture of the fastener by injection molding the ring, inserting it in the nut and exposing the latter to induction heating whereby only the surface of the ring is fused and bonded to the metal.

7 Claims, 4 Drawing Figures

INVENTOR.
HARRY SCHEFFER

INVENTOR.
HARRY SCHEFFER
BY Kelman and Berman

AGENTS

THREADED FASTENING DEVICE AND METHOD OF MAKING THE SAME

This application is a continuation-in-part of the copending application, Ser. No. 764,263, filed on Oct. 1, 1968, now U.S. Pat. No. 3,520,342.

This invention relates to threaded fasteners, such as nuts and bolts, and particularly to self-sealing and self-locking fasteners.

As disclosed in the aforementioned application, a nut or bolt body of metal or other rigid material may be provided with a ring of more resilient material which is partly recessed in an annular depression in the seating face of the body about the fastener axis and fastened to the walls of the depression. It has now been found that the fasteners of the earlier application are more effective when the portion of the ring which projects axially from the depression is conical about the axis of the nut while the ring is in the relaxed condition, whereas the projecting portion of the earlier disclosed rings is toroidally curved.

In order to obtain the conical shape in the finished product, the ring must be separately molded, as by injection molding, and inserted in the depression and fixedly bonded to the metal without distortion. This is achieved by inserting the molded ring in the depression of the more rigid body member, and heating only the metallic body member while the ring, made of thermoplastic material, is heated by contact with the hot walls of the depression. Its interior can readily be kept cold enough to maintain the partly conical shape of the ring while the ring surface is heated beyond the softening point, and may actually be fused.

Other features, the more specific objects, and many of the attendant advantages of this invention will readily become apparent as the same become better understood by reference to the following detailed description of a preferred embodiment when considered in connection with the appended drawing, in which.

Figure 1:
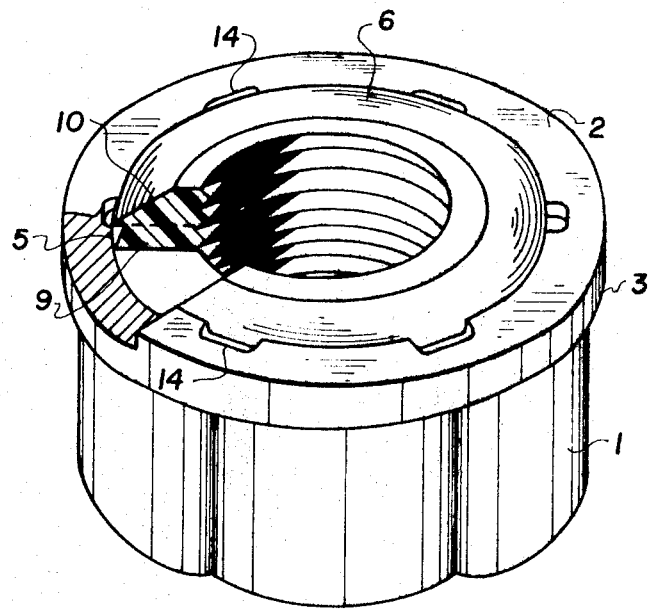
FIG. 1 shows a sealing nut of the invention in a perspective view and partly in axial section.
Figure 2:
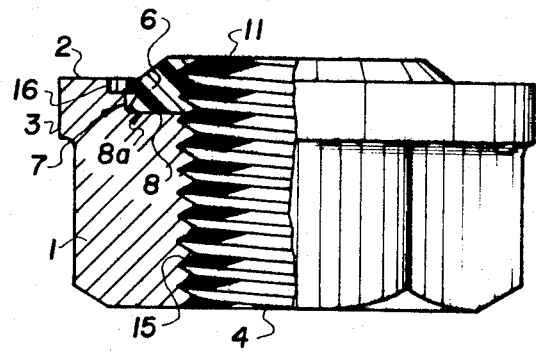
FIG. 2 shows the nut of FIG. 1 in elevation and partly in axial section.

Referring now to the drawing in detail and initially to FIGS. 1 and 2, there is seen a self-sealing fastening device of the invention consisting essentially of a steel body 1 and a nylon or other polyamide ring 6. The nut body 1 has the shape of a hexagonal nut provided with an integral, cylindrical collar 3 which projects beyond the flat axial faces of the hexagonal nut portion in a radially outward direction at one axial end of the body 1. The outer diameter of the flat radial seating face 2 at one end of the nut is thus greater than the largest radial dimension of the hexagonal face at the other end.

The axial bore 4 of the nut body communicates with a shallow, cylindrical, coaxial depression 5 in the seating face 2. The axial annular wall 7 of the depression has a height somewhat smaller than the axial width of the collar 3, and the annular, radial bottom wall 8 of the depression 5 has a greatest radial width which is somewhat smaller than the corresponding dimension of the seating face 2.

The bottom portion 9 of the nylon ring 6 is approximately rectangular in cross section and is entirely received in the depression 5 when the ring is in the relaxed condition shown in FIGS. 1 and 2. The top portion 10 of the ring 6 projects partly from the depression 5 and has an outer face which tapers conically in an axial direction outwardly of the depression 5 toward a flat top face which gives the ring portion 10 a generally frustoconical appearance.

The bore 4 of the body portion 1 and the corresponding bore 11 of the ring 6 are coaxial and have continuous internal threads 15 whose turns are identical in shape and dimensions in the body 1 and the ring 6 as long as the latter is in the relaxed condition shown in FIGS. 1 and 2.

Six notches or recesses 14 in the annular seating face 2 communicate with the depression 5 through openings in the annular wall 7. They extend radially outwardly from the depression 5 in the face 2, but are axially shallower than the depression. Their combined radial width is equal to an arc of approximately 90° about the axis of the threads 15, and their combined capacity to the level of the seating face 2 is more than equal to the volume of the upper ring portion 10 which projects beyond that level.

The ring 6 is integrally bonded to the walls 7, 8 of the depression 5 in area contact. To increase the contact area and thereby to strengthen the bond, the walls are partly corrugated, serrated or otherwise roughened as partly shown for the bottom wall 8 at 8a in FIG. 2, the surface roughness not being shown elsewhere in the drawing for the sake of clarity.

The sealing nut shown in FIGS. 1 and 2 has particular utility in fastening workpieces to each other in cooperation with a threaded bolt or stud without permitting leakage along the threaded male member, even though the latter may pass through an oversized opening in one or more of the fastened workpieces.

Figure 3:
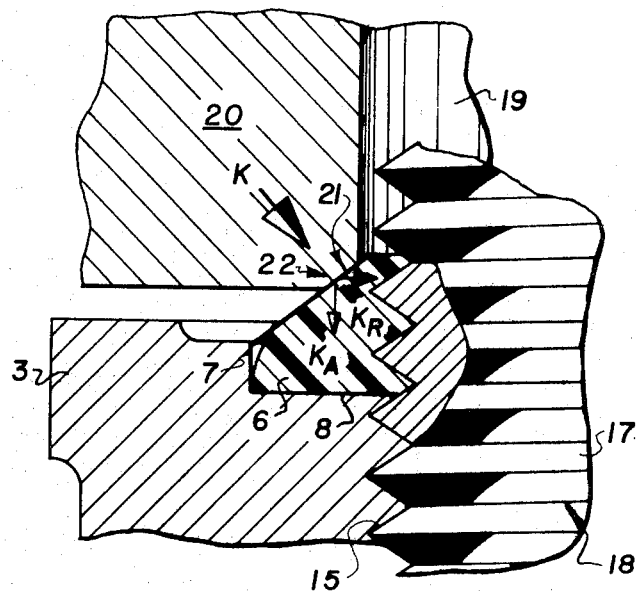
FIG. 3 illustrates the same nut together with a threadedly engaged bolt and a loosely fastened workpiece in fragmentary elevational section on the thread axis and on a scale larger than that of FIGS. 1 and 2.

As illustrated in FIG. 3, the threads 15 of the sealing nut engage the threaded stem 17 of a bolt 18 which passes through an oversized bore 19 in a workpiece 20 and through an aligned bore in another, nonillustrated workpiece, and has a head on the far side of the nonillustrated workpiece. The rim 21 on the workpiece 20 about the bore 19 is provided with a conical bevel 22 as is normal good practice. The apex angles of the conical surfaces of the bevel 22 and of the ring portion 10 are similar and between approximately 90° and 120° C.

When the threaded connection between the nut and the bolt 18 is tightened, contact between the conical surfaces causes pressure to be exerted on the more resilient ring 6 in the direction of the arrow K (FIG. 3), and the ring material is compressed in the directions of the radial and axial components $K_R$, $K_A$ of the pressure K, the radial component being similar in magnitude to the axial component and being applied to a much thinner layer of material. A tight seal is therefore established between the ring portion 10, the workpiece 20 and the bolt 18 before the portion of the ring received in the depression 5 undergoes significant deformation.

During continued tightening of the threaded connection, the ring portion squeezed between the bolt 18 and the bevel surface 22 offers sufficient resistance to further deformation to cause cold flow of the remainder of the ring material. It flows into the previously empty spaces 16 of the recesses 14 without entirely filling the same even after the face 2 is firmly seated on the workpiece 20. The gap between the workpiece 20 and the face 2 is too narrow at the inception of cold flow to permit plastic to be extruded into the gap as long as space is available in the recesses 14. Engagement between the metallic face 2 and the opposite face of the workpiece, also metallic, causes a sudden increase in the resistance of the threaded fastener elements to further relative rotation. Even when not provided with a torque gage on the screw driver or wrench employed for tightening the connection, a workman is not likely to strip the threads 15 or break the stem 17, as would be more likely if an even thin layer of slippery plastic would separate the face 2 from the workpiece 20 and reduce the friction therebetween.

Some dimensional features indicated above are important for best functioning of the sealing nut illustrated. The apex angle of the frustoconical outer face of the ring portion 10 should not substantially exceed 120° nor be substantially smaller than 90° for the desired sequential deformation of the several portions of the ring 6. The significant advantages of the illustrated, partly conical ring shape over the toroidal shape of the corresponding ring parts in the aforementioned earlier application would be lost at least in part by a major deviation from the preferred apex angle range.

It is furthermore important that the notches 14 have an adequate circumferential width. Their depth cannot be increased to the full depth of the depression 5 without impairing the anchorage of the ring 6 to the wall 7, and is very small at best. The effective flow section of the notches 14 is thus controlled mainly by their width, and the combined circumferential width of the notches should not be substantially smaller than shown in the drawing and described above.

Figure 4:
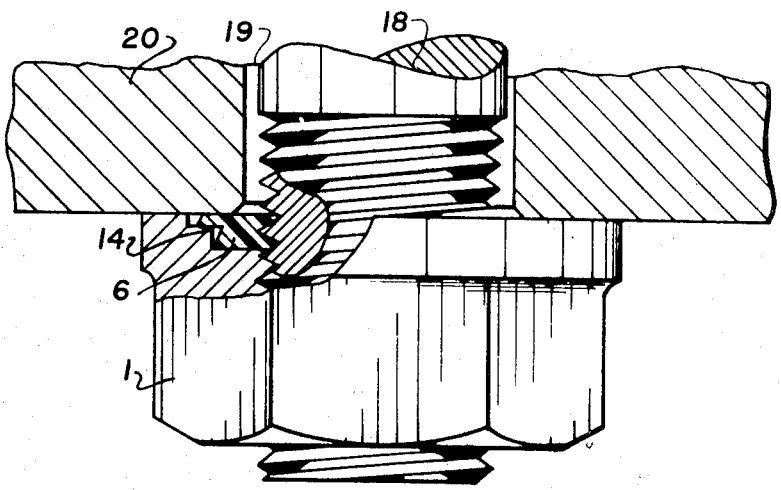
FIG. 4 shows the devices of FIG. 3 in fully tightened condition partly in elevation and partly in section on the thread axis, the scale being that of FIG. 2.

Obviously, the capacity of the recesses 14 must not be smaller than the volume of the ring portion which projects above the level of the seating face 2 if the nut is also to be used on workpieces which do not permit flow of the plastic into an oversized bore in the manner shown in FIGS. 3 and 4.

Damage to the threads or to the bolt by overtightening is made even less likely by making the seating face 2 wide enough. The collar 3 is provided to permit the radial width of the seating face, as measured outwardly from the axially extending wall 7, to be at least equal to the radial width of the wall 8, as measured between the threads 15 and the wall 7. The frictional resistance to overtightening of the connection is directly related to the width of the seating face 2 otherwise comparable conditions.

Proper functioning of the ring 6 is a sealing member, and also as a locking member which prevents loosening of the nut on the bolt 18 is predicated on firm anchorage of the ring 6 to the walls 7 and 8, particularly the wall 8. To provide such anchorage while maintaining the conical configuration of the ring 6 is achieved by the following method of making the nut.

The metallic body 1, as shown in the drawing, is shaped from rod stock on an automatic lathe or in any other desired manner. The thread may be cut into the axial bore at a later stage if so desired. The ring 6 is shaped by injection molding thermoplastic nylon molding composition substantially to the shape shown in FIGS. 1 and 2, but need not be provided with threads in the molding step.

The ring solidified in the mold is inserted in the depression 5 and may be slightly undersized if so desired. The loosely preassembled nut is surrounded by an induction coil to which high-frequency electric current is fed. The frequency, intensity and duration of the current are selected so that the metallic body, and particularly the walls 7 and 8, are heated sufficiently beyond the softening point of the molded material to soften the surfaces of the latter which are opposite the walls 7, 8. Because of the short softening range of nylon, the wall temperature will normally exceed the fusion point of the plastic.

If the metal surfaces are cleaned in a conventional manner prior to insertion of the ring 6, very little axial pressure on the ring 6 is needed for a very short time to provide conforming engagement of the ring with the walls 7, 8. The weight of the ring may be sufficient in relatively large nuts. The nut is withdrawn from the high-frequency electromagnetic field, or the current in the induction coil is shut off before the interior of the ring reaches the softening point. If this precaution is not taken, surface tension forces may cause a deformation of the soft ring toward the undesired toroidal shape, and the conical configuration is lost.

Unless sections of the thread 15 were formed on the lathe in the bore 4, and in the bore 11 on the injection molding machine, the threads are cut in the nut body and in the ring after assembly in a single operation.

Nylon heated beyond the softening point to partial fusion adheres well to clean steel, and the bond obtained after cooling of the bonded elements below the softening point of the plastic is very strong. Similar welded bonds can be produced between other metals and other plastics in a manner known in itself, but nylon, or other polyamide, and steel are most widely useful. The sealing nuts of the invention have been used successfully for fastening workpieces to each other where high pressures were encountered on one side of the connection. The connection is immune to vibration and similar mechanical stresses which would tend to loosen ordinary nuts and bolts.

While the preceding description has been limited to a sealing nut, the invention is equally applicable to sealing bolts having a radial seating face on their heads about the partly threaded shank or stem of the bolt. It should be understood, therefore, that the invention is not limited to the nuts specifically chosen for the purpose of the disclosure, since the nut is merely an example of a fastening device of the invention. Other modifications and variations of the illustrated embodiment will readily suggest themselves to those skilled in the art.

What is claimed is:

1. A fastening device comprising, in combination:
   a. a substantially rigid body member having an axis and formed with a thread about said axis,
      1. said member having a radial seating face formed with a depression substantially cylindrical about said axis,
      2. said depression being bounded by a radially extending wall of said member in an axial direction and by an axially extending wall of said member in a radially outward direction,
      3. said body member being formed with a plurality of recesses extending axially inwardly from said seating face and communicating with said depression through openings in said axially extending wall,
      4. said recesses being angularly offset from each other and jointly extending about said axis in an arc of not substantially less than 90°,
      5. each recess being axially shallower than said depression; and
   b. a ring member of a material substantially more resilient than said body member,
      1. said ring member having a first axial portion received in said depression and a second axial portion,
      2. said second portion having a frustoconical outer face about said axis and projecting from said depression in the relaxed condition of said ring member,
      3. said outer face tapering in an axial direction outwardly of said depression,
      4. a face of said first portion being fixedly bonded to at least one of said walls in area contact,
      5. the combined capacity of said recesses to the level of said seating face being sufficient to receive the volume of said second portion projecting beyond said seating face in said relaxed condition.

2. A device as set forth in claim 1, wherein said first portion is of substantially circular cross section about said axis.

3. A device as set forth in claim 1, wherein said ring member is formed with an internal thread about said axis, the thread of said ring member being substantially identical in shape and dimensions of each turn with the thread of said body member.

4. A device as set forth in claim 3, wherein said rigid member is formed with an axial bore communicating with said depression, and is formed with said thread thereof in said bore, said rigid member having a radially enlarged, axially terminal collar portion carrying said seating face.

5. A device as set forth in claim 1, wherein at least one of said walls has a rough surface.

6. A device as set forth in claim 1, wherein the apex angle of said outer face is not substantially smaller than 90° nor substantially greater than 120°.

7. A device as set forth in claim 1, wherein the radial width of said seating face measured outwardly from said axially extending wall is at least equal to the radial width of said radially extending wall measured between said axially extending face and said thread.

* * * * *